Sept. 29, 1931.   E. EIERMANN   1,825,146

LAWN EDGE TRIMMER

Filed Oct. 22, 1929

Inventor
EMANUEL EIERMANN
By His Attorney John J. Lynch

Patented Sept. 29, 1931

1,825,146

UNITED STATES PATENT OFFICE

EMANUEL EIERMANN, OF ROSEDALE, NEW YORK

LAWN EDGE TRIMMER

Application filed October 22, 1929. Serial No. 401,491.

This invention relates to combination lawn edge trimmers and ice cutters and in particular to one which may be used for either purpose with a minimum amount of change necessary in the implement.

A particular object of my invention is to provide a lawn edge trimmer which will effectively trim the edge of the lawn of creeping grass so that the edge will have a finished neat appearance, the implement being operated without strenuous effort and being so arranged that it can be moved rapidly along the pavement or walk adjacent the edge of the lawn to be trimmed so that it can be properly guided in its movement.

A still further object of my invention is the provision of a combination lawn edge trimmer and ice or slush cleaning blade which is mounted for reverse movement on a suitable holder so that the lawn edge trimmer may be continuously used in the summer time and in the winter time it may be reversed so that the working edge of the device may be used to clean the snow and slush from sidewalk.

A still further object of my invention is the provision of a combination lawn trimmer and ice scraper which may be made up at small cost which is durable in construction and which will effectively trim the edge of the lawn without damaging the path or marring the edge of the sidewalk adjacent the lawn edge.

To enable others skilled in the art to fully comprehend the underlying feature of my invention that they may embody the same in the various modifications in structure and relation contemplated, a drawing depicting a preferred form has been annexed as a part of this disclosure and in such drawing, similar reference characters denote corresponding parts throughout all the views, of which, Figure 1 is a view in perspective showing the use of my lawn edge trimming implement.

Figure 1:
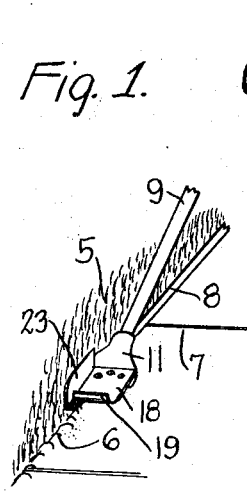

Referring to the drawing in detail, 5 indicates a lawn, the edge of which is to be trimmed, the edge being indicated by the numeral 6 and showing the creeping grass growing over the edge of the sidewalk 7 which gives the lawn an upkempt appearance which it is desired to correct through the use of my improved implement. When the cutting operation has been completed, the grass adjacent the edge of the sidewalk 7 will have been removed and a thin slot or groove 8 left in the sod from which the roots of the edge grass have been removed through the medium of a horizontal cutter portion employed in connection with my implement.

The implement consists of a handle 9 made of wood or any other suitable material, one end of which is arranged to be inserted in the socket portion 10. The holder is preferably cast or formed from metal and in addition to the socket portion 10 comprises the flat base portion 12 which is provided with the opening 13 through each of which pass suitable retaining bolts 14. These bolts are held in position through the medium of the nuts 15 which are threaded thereon beneath the base portion 12, the bolts passing through suitable openings 16, provided in the implement blade 17, the holes 16 coinciding with the holes 13 of the base portion 12.

Figure 2:
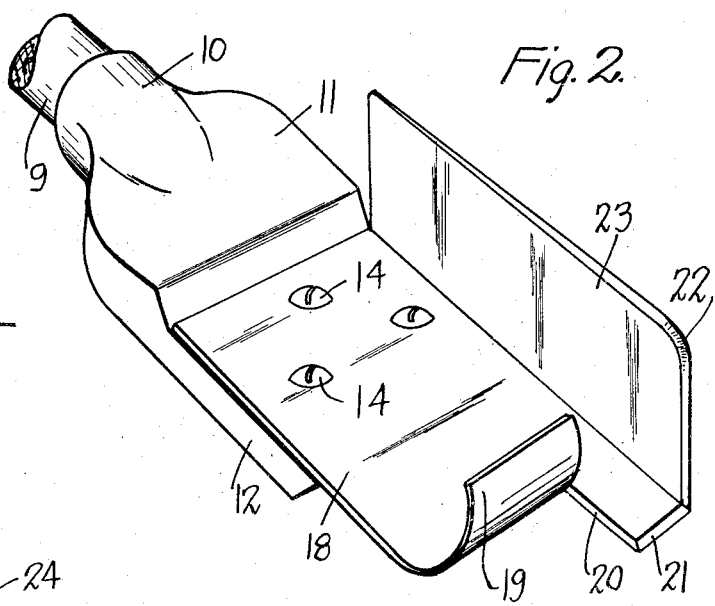
Figure 2 is an enlarged view in perspective of the implement, the same being provided with a rolled edge and an extended cutting portion and the cutting edge being at the left hand side of the cutting implement as used.

In the form of my invention illustrated in Figure 2 only three holes are provided in the implement blade 18, the number employed being sufficient to secure the lawn edge trimmer to the holder 11. In the construction referred to the implement is constructed only for the purpose of trimming the edge of the lawn and in such form is provided with a rolled forward edge 19 which is rolled up after the metal has been slit to provide the extended horizontal cutter 20 which at its forward edge as of 21 is sharpened and forms a continuation of the cutting edge 22 which has been formed along the front and upper edges of the upstanding portion 23 or vertical piece of the blade 18. This vertical member is formed into the width of blade and is simply bent at right angles thereto and thereafter sharpened to provide the cutting edge 22.

As illustrated in Figure 1 during the operation of the device the rolled edge 19 rides along the pavement adjacent the edge of the lawn to be trimmed while the horizontal cutter extension 20 in conjunction with the cutting edges 21 and 22, neatly cut out a groove 8 in the edge of the sod or lawn and remove the creeping grass at the edge of the lawn thereby enhancing the appearance of the same.

Figure 3:
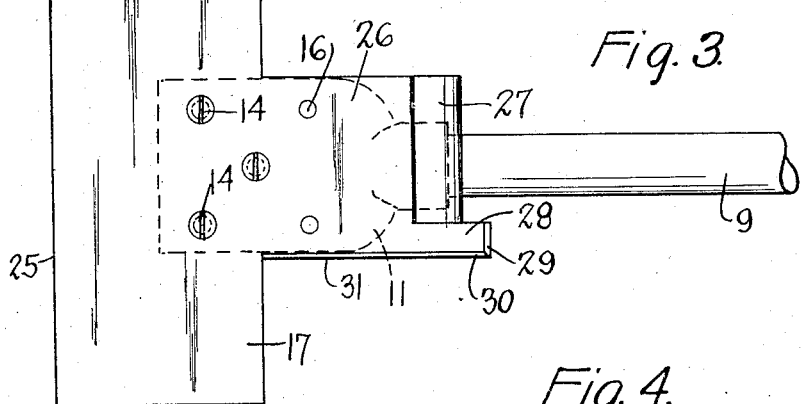
Figure 3 is a top plan view of a combination implement in which is incorporated a lawn edge trimmer and a ice scraper, the implement being reversible on the handle so that either end may be used in a trimming or scraping operation, and, Figure 4 is a view in side elevation slightly enlarged of the combination implement illustrated in Figure 3.
Figure 4:
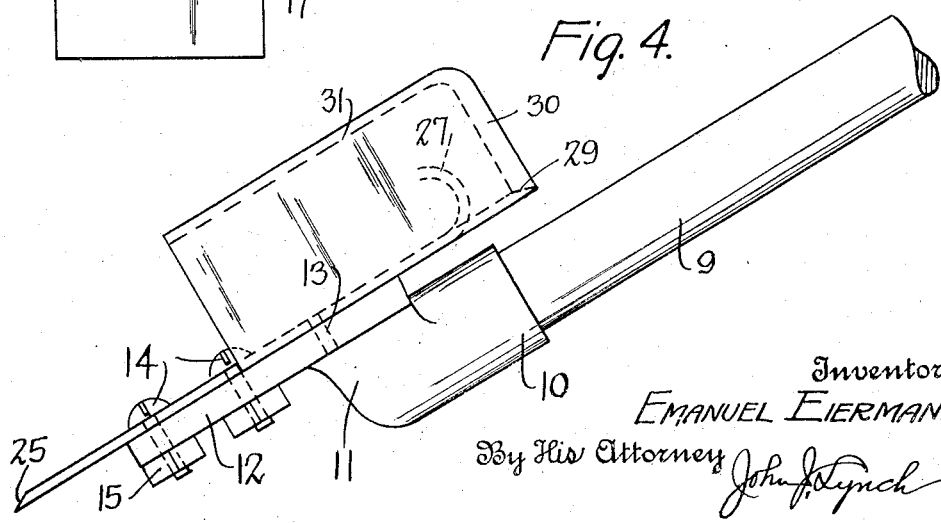

In providing a combination ice scraper and lawn edge trimmer as illustrated in Figures 3 and 4, I provide the blade with the extended side portions 24 and sharpen the forward edge of the blade 17 as of 25 so that it will effectively scrape the pavement to free the same from ice, slush, snow or the like. The blade in its extended portion 26 is provided with a rolled edge 27 after the same manner of the lawn edge trimmer illustrated in Figure 2 which roll edge has been provided by splitting the blade to provide the horizontal cutting portion 28 having a cutting edge 29 which cooperates with the cutting edge 30 formed on the vertical portion 31. In the position illustrated in Figures 3 and 4 the scraper is in position for use but should it be desired to use the lawn edge trimmer, it is simply necessary to remove two of the bolts 14 so that the central bolt acts as a pivot about which the blade may be revolved to bring the lawn edge trimmer in a forward position so that it may function as a lawn trimming implement.

The blade is made of heavy sheet metal which may be painted to match the holder 11. If desired the lawn edge trimmer may be made up for left hand or right hand use as illustrated in Figures 1 and 2 although the preferred form is as illustrated in Figure 1 in which the cutting edge is at the right hand side of the blade.

The extension 20 provides a groove along the border of the walk of uniform width.

It is evident therefore that I have provided a combination lawn edge trimmer and ice cutter or scraper which is durable in construction and which may be used to perform either of its functions by a simple adjustment of the holding member.

It is also evident that I have provided a lawn edge trimmer which will effectively cut out the roots of the border grass thus clearing the edge of the lawn of creeping grass and enhancing the appearance of the grass plot or lawn.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention, what I claim as new, and desire to secure by United States Letters Patent is:—

A lawn edge trimmer comprising a holder having integral base and socket parts, a blade secured to the base and having a horizontal and a vertical portion, said horizontal portion being slit adjacent said vertical portion and curved upwardly to provide a rolled edge, the leading edges of the unrolled horizontal portion and the said vertical portion being sharpened.

EMANUEL EIERMANN.